United States Patent [19]

Puustinen

[11] 4,037,793
[45] July 26, 1977

[54] CITRUS GRATER

[76] Inventor: Lois J. Puustinen, 3560 Hayden Bridge Road, Springfield, Oreg. 97477

[21] Appl. No.: 662,151

[22] Filed: Feb. 27, 1976

[51] Int. Cl.² .................................................. A47J 43/25
[52] U.S. Cl. ........................................ 241/30; 241/95; 241/168; 241/273.4
[58] Field of Search ............... 241/30, 95, 168, 273.1, 241/273.2, 273.3, 273.4

[56] References Cited

U.S. PATENT DOCUMENTS

| | | | |
|---|---|---|---|
| 2,505,114 | 4/1950 | Hayman | 241/273.2 X |
| 2,601,087 | 6/1952 | Buedingen | 241/95 X |
| 2,720,234 | 10/1955 | Fett | 241/273.1 |
| 3,195,598 | 7/1965 | Koch | 241/168 |
| 3,583,455 | 6/1971 | Ostrowsky | 241/95 |
| 3,589,421 | 6/1971 | Locker | 241/95 |

FOREIGN PATENT DOCUMENTS

| | | | |
|---|---|---|---|
| 4,421 | 3/1915 | United Kingdom | 241/168 |

Primary Examiner—Roy Lake
Assistant Examiner—Howard N. Goldberg
Attorney, Agent, or Firm—Chernoff & Vilhauer

[57] ABSTRACT

A hand-holdable citrus grating element having a shallow concave grating surface conforming substantially in size and shape to a selected segment of the exterior surface of a citrus fruit, such element having a plurality of apertures formed therethrough and surrounded by one or more protrusions for gratingly removing only the extreme outer oil-bearing portion of the citrus fruit rind as the grating element and citrus fruit are moved against one another in conforming contact. The apertures formed through the grating element permit the grated rind to pass through the element as the rind is scraped from the fruit. In one embodiment, a small dish-like receptacle is provided to facilitate holding the grating element and maintaining its grating surface in conforming contact with the surface of the citrus fruit as the fruit and element are moved against each other, and for receiving and retaining the oil-bearing portion of the rind as it is scraped from the fruit and passed through the apertures in the element. In other embodiments, hook-like and handle-like appendages are attached to the grating element to facilitate holding the element in or over a separate receptacle or work surface.

8 Claims, 10 Drawing Figures

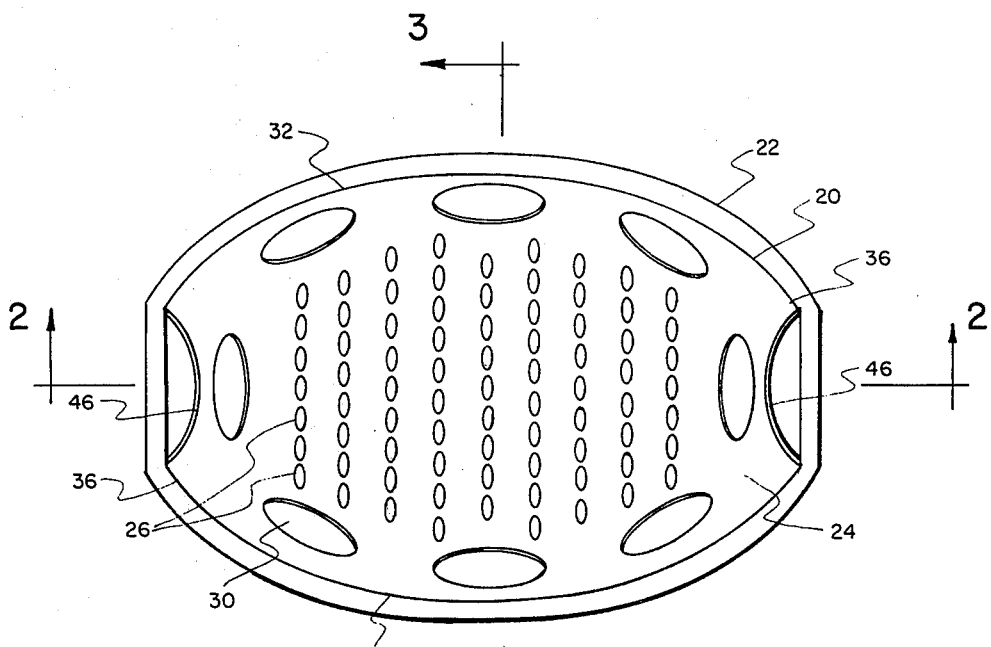
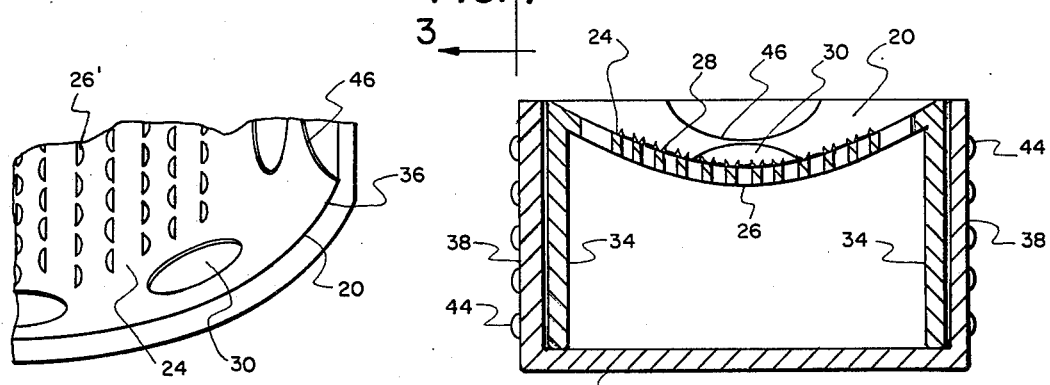
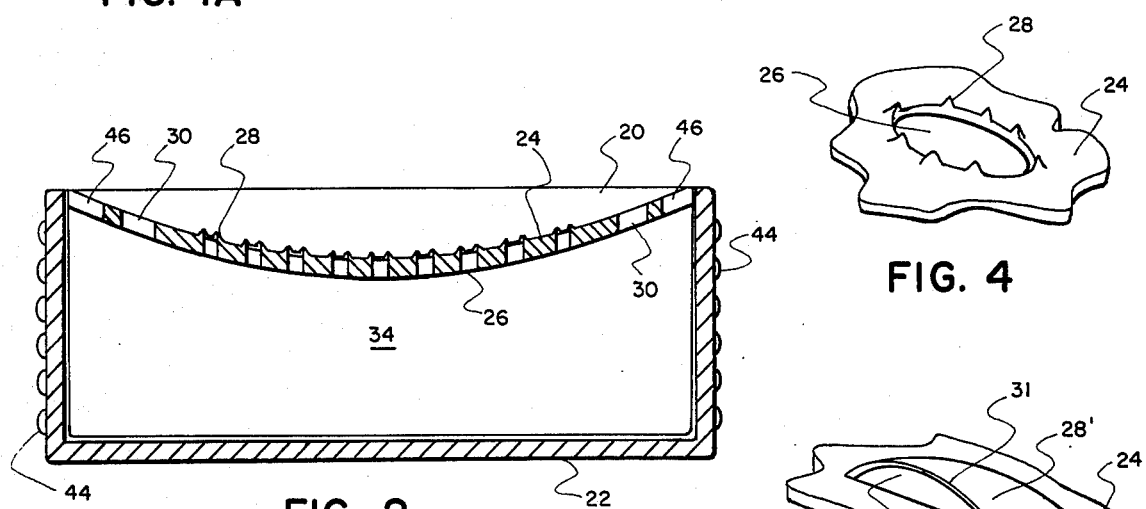
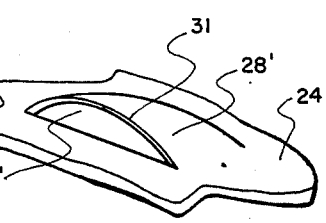

CITRUS GRATER

BACKGROUND OF THE INVENTION

The present invention relates to devices for removing the extreme outer portion of the rind from citrus fruits. Devices capable of removing the entire outer covering or skin from various edible vegetables and fruits have been known for some time. Examples of such devices include the vegetable peeler or scraper disclosed by Milhado U.S. Pat. No. 902,428 and the kitchen tool and utensil disclosed by Buedingen U.S. Pat. No. 2,601,087, as well as various other scraping and paring devices known to those familiar with the culinary arts and readily available in the housewares sections of most department stores. Generally these known devices comprise one or more operative elements and means for either moving a particular element over the item being peeled or for holding the element stationary while the item is rubbed across the element. The working surfaces of the elements usually include a plurality of pointed protrusions or bladed apertures formed therein to scrape or pare the skin from the surface of the vegetable or fruit being worked. Other protrusions or apertures are often included for shredding or grating the vegetable or fruit into large or small particles respectively.

The principal disadvantage of known prior art devices is that, because their peeling, shredding or grating means protrude a substantial distance from a flat working surface, they are not suitable for gratingly removing only the extreme outer oil-bearing portion of the rind from citrus fruits, such as oranges, lemons and limes, without also at the same time removing the less desirable white inner skin lying thereunder. The problems attendant with grating only the oil-bearing outer portion of the relatively thick rind of citrus fruits are wholly different from the problems attendant with removing the entire relatively thin skins from other vegetables and fruits such as carrots, potatoes, apples and the like, and with shredding or grating such vegetables and fruits. Usually the skins of the latter group of vegetable and fruits are removed to prepare the vegetable or fruit for cooking or eating and, as the skin is to be discarded, it is not particularly important how deeply the peeling device penetrates into the body of the vegetable or fruit as long as it removes the entire skin. Moreover, for the same reason, it is not important how the skin is removed, i.e. in strips, chunks or lumps. Further, when shredding or grating such vegetables and fruits, as it is the body rather than the skin that is to be operated upon, and it is again not particularly important how deeply the device penetrates as long as the material is removed in the desired size of particles. For example, carrots, cabbages, potatoes, etc. may be shredded or grated to any required depth merely by repeating the shredding or grating process until the desired volume of particulate matter has been accumulated. There is no need for selectivity in the manner in which material is removed from the particular vegetable or fruit.

When gratingly removing the oil-bearing outer portion of the rind from citrus fruit, however, it is the grated rind itself that is to be saved and used, and if the rind-removing device is permitted to penetrate too deep below the surface of the fruit it will remove not only the oil-bearing outer surface of the rind but a substantial amount of the white inner skin material lying below the rind as well. This additional material from deep within the body of the rind has a taste substantially different and less appetizing than that of the oil-bearing portion of the rind and its concurrent removal and mixing with the outer surface of the rind produces a mixture that is less desirable as a culinary additive. Furthermore, to be usable as a flavoring agent, the oil-bearing portion of the rind must be removed in a grated or fine particle form and, if the rind is removed in large strips or chunks, it must subsequently be reduced in size to a grated form before being used so as to avoid harsh flavor concentrations.

An additional disadvantage of known paring- or shredding-type devices is the great difficulty encountered when trying to remove the thin outer skin of a substantially ellipsoid object such as a lemon or lime by scraping that object across a flat surface. Inevitably, not only is the skin removed in patches, but a significant portion of the white inner skin is removed as well. Moreover, it is very easy for the hands of the user to contact and be injured by the bladed apertures of the grater surface as the vegetable or fruit is moved. As a result, many persons choose to omit citrus rind from their recipes rather than be forced to use an impure mixture of rind and white inner skin and expose their hands to possible scraping or cutting besides.

SUMMARY OF THE INVENTION

The grating device of the present invention is directed to a means for removing only the outer oil-bearing portion of the rind from citrus fruits without also removing the less desirable white inner skin. More particularly, the present invention comprises a perforated grating element having a shallow substantially concave grating surface that conforms or is conformable in size and shape to a segment of the substantially spheroid or ellipsoid exterior surface of a particular citrus fruit such as an orange, lemon or lime. A plurality of perforating apertures are formed through the grating surface of the element, each of which is surrounded by one or more protrusions extending from the concave surface a limited distance to gratingly remove only the extreme outer surface of the citrus fruit rind as the grating element and fruit are moved against each other. A separate dish-like mating receptacle is preferably provided to facilitate holding the grating element and maintaining its conforming contact against the surface of the fruit, and for receiving and retaining the removed rind particles as they are forced through the apertures formed in the grating surface of the element.

The individual protrusions surrounding each of the grating element apertures extend a distance from the grating surface just sufficient to penetrate the oil-bearing portion of the rind, when the appropriate citrus fruit is pressed against the element, without also penetrating substantially into the less desirable white inner skin lying thereunder. By extending the grating protrusions a distance just sufficient to penetrate the thinnest rind anticipated, the same grating element may be used to grate a variety of citrus fruits with those fruits having relatively thick rinds merely being moved over the element an increased number of times.

Several embodiments of the present invention are envisioned, both with and without the aforementioned mating receptacle. For use without the receptacle, suitable means are provided as a part of the grating element to facilitate its grasp by the human hand and its placement over a suitable separate container, for example a cup or mixing bowl, while the fruit is positioned to substantially cover the entire grating surface, pressed and moved thereagainst, and the rind material removed from the fruit is permitted to pass freely through the grater apertures and fall into the container. The concave surface of the grating element ensures the the rind is removed uniformly over the limited area of contact without creating "flat spots" extending into the white inner material of the rind. When the grating element is used with the mating receptacle, the element is configured to nest within the receptacle and the receptacle itself is formed to be readily grasped by the human hand and held or braced against a supportive surface such as a kitchen counter as the fruit is pressed against the grating element and oscillated back and forth. Once the desired amount of rind has been removed, the grating element is withdrawn from the receptacle, thereby permitting ready access to the accumulated rind. As the fruit substantially covers the entire grating surface, the hands of the operator are prevented from injurious contact therewith and in no case it is necessary to move the hands across the grating surface in a manner exposing the hands to injury from scraping or cutting.

It is, therefore, a principal objective of the present invention to provide a device capable of easily removing only the extreme exterior oil-bearing portion of the rind from citrus fruit without also removing substantial amounts of the less desirable white inner skin thereunder.

It is an additional objective of the present invention to provide a grating element the grating surface of which conforms in size and shape to a segment of the outer surface of a substantially ellipsoid or spheroid citrus fruit.

It is a further objective of the present invention to provide such a device for removing the rid from citrus fruit that includes such a grating element and a mating receptacle for receiving and retaining the rind as it is removed.

It is a still further objective of the present invention to provide a device for removing the rind from citrus fruits without exposing the hands of the operator to injury from scraping or cutting.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a plan view of the preferred embodiment of the conformable grater element of the present invention together with its accessorial receptacle.

FIG. 1a is a detailed partial plan view of an alternate embodiment of the grater element and receptacle of FIG. 1.

FIG. 2 is a sectional view of the grater element and receptacle taken along line 2—2 of FIG. 1.

FIG. 3 is a sectional view of the grater element and receptacle taken along line 3—3 of FIG. 1.

FIG. 4 is a detailed perspective view of a portion of the grater surface of the grater element of FIG. 3.

FIG. 4a is a detailed perspective view of a portion of the grater surface of the alternate grater element of FIG. 3a.

DETAILED DESCRIPTION OF THE INVENTION

Figure 5:
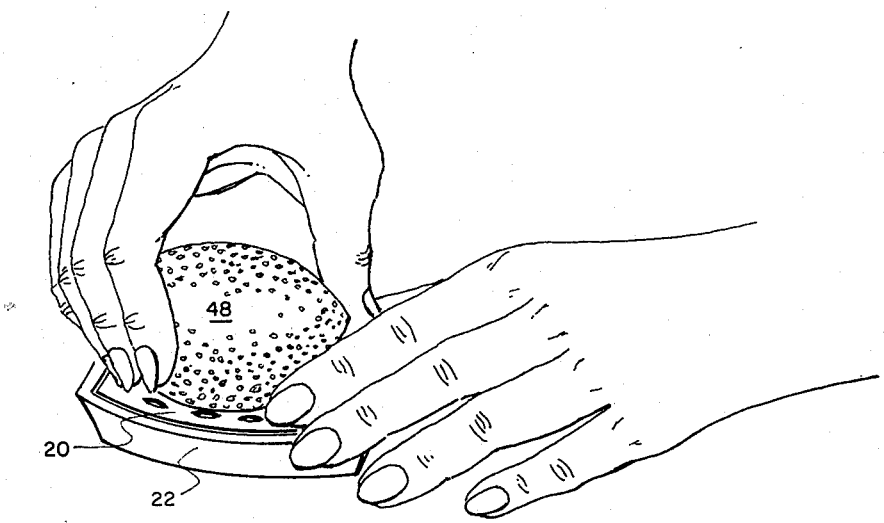
FIG. 5 is a perspective view of the conformable grater and receptacle of FIG. 1 in use to grate the extreme outer rind from a lemon.

As shown in FIGS. 1, 2 and 3 of the drawings, the preferred embodiment of the present invention comprises a perforated grating element 20 (shown in combination with an accessorial dish-like receptacle 22 described below) having a shallow concave grating surface 24 that is perforated by a plurality of apertures 26 each of which is surrounded by a plurality of outwardly-directed protrusions 28, shown in greater detail in FIG. 4. The apertures 26 are arranged over the surface 24 of the grating element 20, as shown best in FIG. 1 in a pattern of staggered rows covering substantially the entire central portion of the element. A plurality of larger apertures 30 are arranged in ring-like fashion around the area of the element perforated by the apertures 26 for reasons discussed more fully below. Extending downwardly along either side 32 of the grating element 20 is a tab 34 which provides rigidizing support for the grating element and also facilitates its grasp by the human hand. Increased support and grasping assistance may be achieved by extending the side tabs 34 around the ends 36 of the grating element to form a depending enclosure.

Returning to FIG. 4, the apertures 26 perforating the surface 24 of the concave grating element 20 are seen to be substantially elliptical in outline and surrounded completely about their periphery by the outwardly directed protrusions 28 each of which tapers rapidly to a fine point in a direction substantially perpendicular to the plane of the aperture. Alternately, the protrusions may be in the form of sharp-edged semi-circular mounds 28' as shown in FIG. 4a, with the aperture 26' formed perpendicularly to the grating surface 24 between the cutting edge 31 of the mound 28' and the grating surface 24. Such mounds are arranged over the surface 24 of the grating element 20 in alternating opposite-facing fashion, as shown in FIG. 1a, to permit grating action, as described below, in two directions.

The dish-like receptacle 22 shown in FIGS. 1, 2 and 3 is configured to nestingly receive the grating element 20 in a mating relationship with its grating surface 24 exposed and with its tabs 34 snugly enclosed within the receptacle side walls 38. The side and end walls of the receptacle are preferably at right angles to the bottom of the receptacle, as shown in the figures, for ease of manufacture, but inclined walls could be employed as well. The depth of the receptacle 22 is preferably about 2.5 cm so that, when the grater element 20 having a preferred depth of about 6 to 13 mm, for reasons described more fully below, is nested thereon, the outer edges of the grater surface 24 are even with the tops of the receptacle walls. Means may be provided for retaining the grater element within the receptacle 22 with sufficient security to prevent the two pieces from becoming accidentally separated during use. The exterior surfaces of the side and end walls are covered with a plurality of small rounded protrusions 44 to provide the receptacle with a pebble-grained exterior that is relatively easy to grasp. To facilitate the removal of the grating element 20 from the receptacle 22, a notch 46 is formed in either end of the grating element to permit a fingernail, spoon handle, or similar lever to be inserted between the grating element and receptacle to pry the two pieces apart.

In use, the grating element and its accessorial receptacle 22 are assembled and held, as shown in FIG. 5, in a braced position against a supportive surface such as a kitchen countertop while a citrus fruit, for example a lemon 48, is pressed into conforming contact with the grating surface 24 of the grating element 20 and moved back and forth in a slight rocking or arcuate motion to permit the protrusions 28 extending from the grating surface to scrape off the extreme outer oil-bearing portion of the fruit rind and to force the removed rind through the apertures 26 and into the receptacle.

It is very important for successful operation of the grating element that the concave grating surface 24 remain shallow yet conform in size and shape substantially to the segment of the exterior surface of the citrus fruit being processed. If the concave shape of the grating surface 24 deviates substantially from the shape of the exterior surface of the fruit being processed, the rind will be removed non-uniformly with the result that more rind will be taken from one area of the fruit than from another and with the further result that more than just the extreme outer oil-bearing portion of the rind will be removed. Actual experimentation with grater elements of varying depths indicates that both the grating efficiency and the ability to control the fruit being processed are reduced significantly if the grater element has a maximum depth substantially greater than about 6 to 13 mm. The conforming shape of the grating surface may be obtained either by constructing the grating element of a rigid or semi-rigid material having a concave surface pre-shaped to closely match the typical spheroid or ellipsoid surface of the particular citrus fruit to be worked, or by constructing the element of a more flexible, conformable material of concave shape which will conform closely to the shape of the fruit upon contact. Exact conformance is not necessary because of the resilient nature of the citrus fruit itself permitting the fruit to conform somewhat to the shape of the grating element. Such grating element 20 may be of any suitable material, such as metal or plastic, sufficiently rigid to maintain the points of the protrusions 28 or the edges 31 of the mounds 28' over a reasonable period of use.

Figure 5A:
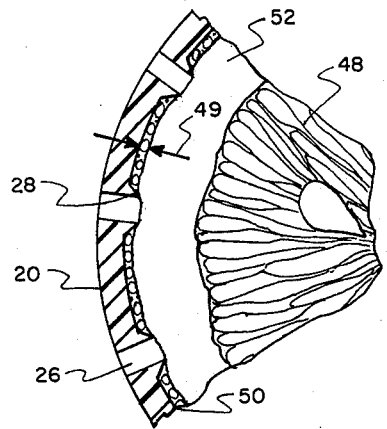
FIG. 5a is a detailed sectional view of the conformable grater element of FIG. 1 with its grating surface in position against the outer surface of a citrus fruit.

As indicated in FIG. 5a it is also very important that the protrusions 28, 28' extend substantially no further from the grating surface than the thickness 49 of the extreme outer oil-bearing portion 50 of the fruit rind. If the protrusions 28, 28' extend from the grating surface 24 a distance greater than the thickness 49 of the oil-bearing portion 50 of the rind, a portion of the less desirable white inner skin 52 of the fruit will be removed.

The staggered arrangement of the apertures 26 ensures that the rind will be removed uniformly rather than in rows or furrows. As the fruit is oscillated against the grating element 20, the rind material that is removed from the fruit, but which does not pass through the apertures 26, will be forced outwardly toward the edges of the grating element and fall through the larger apertures 30 formed therearound. After the desired amount of rind has been gratingly removed from the fruit, the grating element 20 is pried from the receptacle 22, as described earlier, revealing the grated rind.

It is understood that the grating element 20 may be used alone without the accessorial receptacle 22 by holding the element over a work area or suitable separate receptacle, such as a measuring cup. As the fruit is oscillated against the grating surface, the grated rind will fall through the apertures 26 to the work surface or receptacle for subsequent use.

Grating elements of differing sizes are envisioned for different sizes of fruit, for example a small element for a lemon or lime and a larger element for an orange or grapefruit; however, the size of the protrusions 28, 28' and the distance that they extend from the surface of the grating element remains essentially constant. This is so because, even though the thickness of the extreme outer oil-bearing portion of a citrus fruit rind will vary among different citrus fruits and also among different species of each fruit, the minimum thickness of the various oil-bearing layer do not vary substantially. For example, a typical lemon having a diameter of about 6 cm and a total rind thickness of from 4 to 5 mm has been found to have a varying oil-bearing rind thickness of from 1 to 2 mm and, accordingly, to grate substantially only the oil-bearing portion of the rind from such a lemon the protrusions 28, 28' should extend from the grating surface 24 no further than the minimum thickness of the oil-bearing rind or about 1 mm, preferably extending in the range from about 0.5 to 1 mm, to permit the optimum amount of oil-bearing rind to be removed yet minimizing the amount of white inner rind that is also removed. Similarly, a typical orange having a diameter of about 8 cm and a total rind thickness of from 3 to 4 mm has been found to have a varying oil-bearing rind thickness of from 1 to 3 mm and, therefore, the protrusions 28, 28' to grate such an orange should extend from the grating surface 24 preferably no further than the same 1 mm, with the additional thickness of oil-bearing rind being removable by successive passes of the orange across the grating element.

Figure 6:
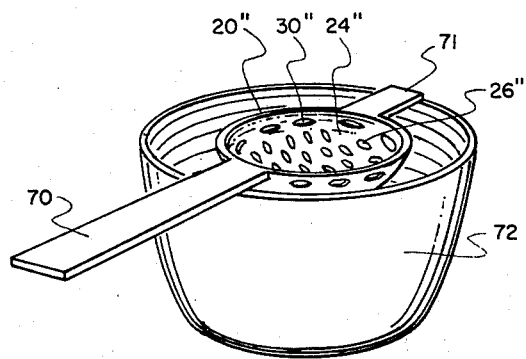
FIGS. 6 and 7 are perspective views of alternate configurations of the conformable grater element of the present invention.

In an alternate embodiment of the present invention, shown in FIG. 6, the grating element 20" is fitted with a handle 70 as well as a hook-like appendage 71 to facilitate holding the grating element over any suitable cup-like receptacle 72 with the concave grating surface 24" of the element facing upwardly. In use, the grating element which is otherwise similar to grating element 20 is held in place by gripping the handle 70 while the citrus fruit is pressed downwardly against the conforming concave grating surface and rotated gently back and forth with a circular or rocking motion to permit the rind to be scraped from the fruit. As the rind is removed, it passes through the apertures 26" perforating the element and falls into the receptacle.

Figure 7:
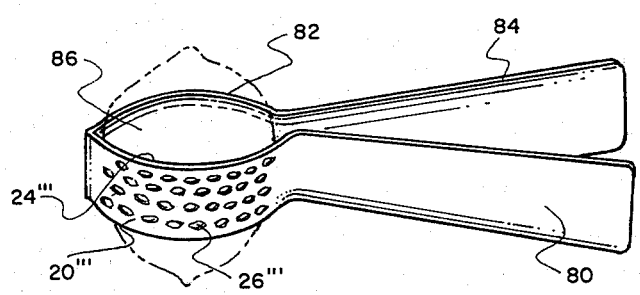

In a third embodiment of the present invention, that shown in FIG. 7, the grating element 20''' is fitted with a handle 80 and a complementary smooth-surfaced element and handle 80 and 84 respectively, and is otherwise similar to the grating element 20. The concave grating surface 24''' of the grating element is oriented to face toward the inner face 86 of the complementary smooth-surfaced element 82 such that a citrus fruit may be placed between the grating surface and the inner surface of the complementary element while the two handles 80 and 84 are pressed together to bring the grating surface into conforming contact with the exterior of the fruit. In this manner, the device may be held over an open-top receptacle, such as a mixing bowl, while the citrus fruit is positioned as described and rotated back and forth while the two handles are pressed toward one another. The rind of the fruit, as it is grated, falls through the perforating apertures 26''' of the grating element and into the separate receptacle.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for gratingly removing the extreme outer oil-bearing portion of the rind from citrus fruits, said device comprising a grating element having a flexible grating surface preformed in a concave, curved shape and flexibly conformable in shape to both spherical and nonspherical convex surfaces when any of said convex surfaces is pressed thereagainst, said grating element having a plurality of apertures formed therethrough, and grating means protruding from said grating surface proximate each of said apertures for penetrating substantially only the extreme outer oil-bearing portion of the rind of a citrus fruit as said fruit is pressed against said grating surface, said grating means protruding from said grating surface a distance sufficient to penetrate said oil-bearing portion of said rind without also substantially penetrating the white inner skin material lying thereunder, whereby, when said citrus fruit is pressed against said grating surface and moved relative thereto, the oil-bearing portion of said rind penetrated by said grating means is gratingly removed from said fruit and forced through said apertures.

2. The grating device of claim 1 wherein said grating means comprises a plurality of protrusions extending from said grating surface around each said aperture, said protrusions tapering to a point in a direction substantially perpendicular to said grating surface.

3. The grating device of claim 1 wherein said grating means comprises a semi-circular mound extending from said grating surface over each of said apertures, one side of said mound defining a cutting edge rising above a respective one of said apertures.

4. The grating device of claim 3 wherein said semi-circular mounds are arranged over said grating surface in rows with the cutting edges of alternate rows facing in opposite directions.

5. The grating device of claim 1 further comprising a dish-like receptacle nestingly receiving and retaining said grating element with said concave grating surface facing away from said receptacle, said receptacle completely enclosing the apertured portion of said grating element opposite said grating surface such that said oil-bearing portion of said rind removed from said citrus fruit and forced through said apertures will fall into and be retained by said receptacle.

6. The grating device of claim 1 further comprising hook-like means extending from one edge of said grating element and a handle extending from an opposite edge of said grating element to facilitate the manual positioning of said grating element across the opening of a separate cup-like receptacle with said concave grating surface facing away from the interior of said receptacle.

7. A method of gratingly removing the extreme outer oil-bearing portion of the rind from a citrus fruit said method comprising the steps of (a) pressing the convex exterior surface of said citrus fruit against a preformed concave grating surface that is flexibly conformable in shape to both spherical and nonspherical convex surfaces when any of said convex surfaces is pressed thereagainst, said grating surface having a plurality of apertures formed therethrough and grating protrusions extending therefrom; (b) flexibly conforming said grating surface to the surface of said fruit by said pressing; (c) penetrating substantially only the extreme outer oil-bearing portion of the rind of said citrus fruit with said protrusions as said fruit is pressed against said grating surface; and (d) moving said fruit relative to said surface so as to permit said grating protrusions to remove said portion of said rind thus penetrated and force said removed rind through said apertures.

8. A device for gratingly removing the extreme outer oil-bearing portion of the rind from citrus fruits, said device comprising a grating element having a flexible grating surface preformed in a concave, curved shape and flexibly conformable in shape to both spherical and nonspherical convex surfaces when any of said convex surfaces is pressed thereagainst, said grating element having a plurality of apertures formed therethrough, and grating means protruding from said concave grating surface proximate each of said apertures for penetrating substantially only the extreme outer oil-bearing portion of the rind of a citrus fruit as said fruit is pressed against said grating surface, said grating means protruding from said grating surface a distance sufficient to penetrate said oil-bearing portion of said rind without also substantially penetrating the white inner skin material lying thereunder, whereby, when said citrus fruit is pressed against said grating surface and moved relative thereto, the oil-bearing portion of said rind penetrated by said grating means is gratingly removed from said fruit and forced through said apertures, said grating device further comprising a first handle extending from said concave grating element and a second handle having a concave portion thereof shaped complementary to said grating element hingedly attached to said grating element such that said concave grating surface and said concave portion of said second handle may be brought into an opposed, facing relationship for holding said citrus fruit therebetween.

* * * * *

UNITED STATES PATENT AND TRADEMARK OFFICE
CERTIFICATE OF CORRECTION

PATENT NO. : 4,037,793
DATED : July 26, 1977
INVENTOR(S) : Lois J. Puustinen

It is certified that error appears in the above-identified patent and that said Letters Patent are hereby corrected as shown below:

Col. 3, line 4        Change "the the" to --that the--;

line 19       Change "it is" to --is it--;

line 35       Change "rid" to --rind--;

Col. 6, line 16       Change "layer" to --layers--.

Signed and Sealed this

Thirtieth Day of May 1978

[SEAL]

Attest:

RUTH C. MASON
*Attesting Officer*

LUTRELLE F. PARKER
*Acting Commissioner of Patents and Trademarks*